United States Patent [19]
Bloomberg et al.

[11] Patent Number: 5,355,420
[45] Date of Patent: * Oct. 11, 1994

[54] METHOD AND APPARATUS FOR IDENTIFICATION OF DOCUMENT SKEW

[75] Inventors: Dan S. Bloomberg, Palo Alto; Gary E. Kopec, Belmont, both of Calif.

[73] Assignee: Xerox Corporation, Rochester, N.Y.

[*] Notice: The portion of the term of this patent subsequent to Feb. 16, 2000 has been disclaimed.

[21] Appl. No.: 963,159

[22] Filed: Oct. 19, 1992

Related U.S. Application Data

[62] Division of Ser. No. 448,774, Dec. 8, 1989, Pat. No. 5,187,753.

[51] Int. Cl.$^5$ .............................. G06K 9/32
[52] U.S. Cl. ........................ 382/46; 382/18; 358/488; 345/126
[58] Field of Search ............ 382/30, 46, 51, 18; 358/488; 340/727; 395/137; 345/126; H04N 1/17

[56] References Cited

U.S. PATENT DOCUMENTS

| | | | |
|---|---|---|---|
| 454,339 | 12/1989 | Spitz | 382/46 |
| 3,831,146 | 8/1974 | Rundle | 340/146.3 |
| 4,052,699 | 10/1977 | Micka et al. | 340/146.3 |
| 4,338,588 | 7/1982 | Chevillat et al. | 340/146.3 |
| 4,414,685 | 11/1983 | Sternberg | 382/49 |
| 4,499,499 | 2/1985 | Brickman et al. | 358/263 |
| 4,533,959 | 8/1985 | Sakurai | 358/280 |
| 4,558,461 | 12/1985 | Schlang | 382/9 |
| 4,633,507 | 12/1986 | Cannistra et al. | 382/61 |
| 4,700,400 | 10/1987 | Ross | 382/27 |
| 4,723,297 | 2/1988 | Postl | 382/46 |
| 4,742,558 | 5/1988 | Ishibashi et al. | 382/56 |
| 4,747,150 | 5/1988 | Knutsson et al. | 382/21 |
| 4,747,151 | 5/1988 | Knutsson et al. | 382/21 |
| 4,747,152 | 5/1988 | Knutsson et al. | 382/21 |
| 4,748,676 | 5/1988 | Miyagawa et al. | 382/46 |
| 4,759,075 | 7/1988 | Lipkie et al. | 382/46 |
| 4,759,076 | 7/1988 | Tanaka et al. | 382/46 |
| 4,783,826 | 11/1988 | Koso | 382/8 |
| 4,783,828 | 11/1988 | Sadjadi | 382/21 |
| 4,786,976 | 11/1988 | Takao et al. | 358/283 |
| 4,791,679 | 12/1988 | Barski et al. | 382/55 |
| 4,805,031 | 2/1989 | Powell | 358/284 |
| 4,809,344 | 2/1989 | Peppers et al. | 382/32 |
| 4,817,186 | 3/1989 | Goolsbey et al. | 382/9 |
| 4,821,333 | 4/1989 | Gillies | 382/49 |

(List continued on next page.)

FOREIGN PATENT DOCUMENTS

| | | |
|---|---|---|
| 0176910 | 4/1986 | European Pat. Off. . |
| 0287027 | 10/1988 | European Pat. Off. . |
| 0287995 | 10/1988 | European Pat. Off. . |
| 0288266 | 10/1988 | European Pat. Off. . |
| 0308673 | 3/1989 | European Pat. Off. . |
| 61-225974 | 10/1986 | Japan . |

OTHER PUBLICATIONS

R. Hunter "International Digital Facsimile Coding Standards", *Proceedings of the IEEE*, vol. 68, No. 7, Jul. 1980, pp. 854–867.

K. Y. Wong, et al., "Document Analysis System", *IBM J. Res. Develop.* vol. 6, No. 6, Nov. 1982, pp. 647–656.

S. R. Sternberg, "Biomedical Image Processing", *IEEE* (1983), pp. 22–34.

W. Postl "Detection of Linear Oblique Structures and Skew Scan In Digitized Documents", IEEE Computer Society Order Number 742, Library of Congress Number 86-81419, IEEE Computer Society Press, Order Number 742, pp. 687–689.

H. S. Baird "The Skew Angle of Printed Documents", *Symposium in Hybrid Imaging Systems*, May 20–21, (List continued on next page.)

*Primary Examiner*—David K. Moore
*Assistant Examiner*—Michael Cammarata
*Attorney, Agent, or Firm*—Townsend and Townsend, Khourie and Crew

[57] ABSTRACT

A method and apparatus for identifying and correcting for document skew. Lines of a bitmap are scanned and a variance in the number of ON pixels as a function of skew angle is calculated. Skew of the original document occurs when the variance is a maximum.

26 Claims, 3 Drawing Sheets

U.S. PATENT DOCUMENTS

| | | | |
|---|---|---|---|
| 4,827,330 | 5/1989 | Walsh et al. | 358/280 |
| 4,858,018 | 8/1989 | Tanaka | 358/456 |
| 4,876,730 | 10/1989 | Britt | 382/37 |
| 4,912,559 | 3/1990 | Ariyoshi et al. | 358/261.1 |
| 4,926,490 | 5/1990 | Mano | 382/9 |
| 4,941,189 | 7/1990 | Britt | 382/46 |
| 4,953,230 | 8/1990 | Kurose | 382/46 |
| 5,001,766 | 3/1991 | Baird | 382/46 |
| 5,187,753 | 2/1993 | Bloomberg et al. | 382/46 |

OTHER PUBLICATIONS

1987, Rochester, N.Y. pp. 21–24.

P. Maragos "Tutorial on advances in morphological image processing and analysis", *Optical Engineering*/Jul. 1987/vol. 26 No. 7/pp. 623–632.

R. M. Haralick, et al. "Image analysis Using Mathematical Morphology", *IEEE Transactions on Pattern Analysis and Machine Intelligence,* vol. PAMI-9 No. 4, Jul. 1987 pp. 532–550.

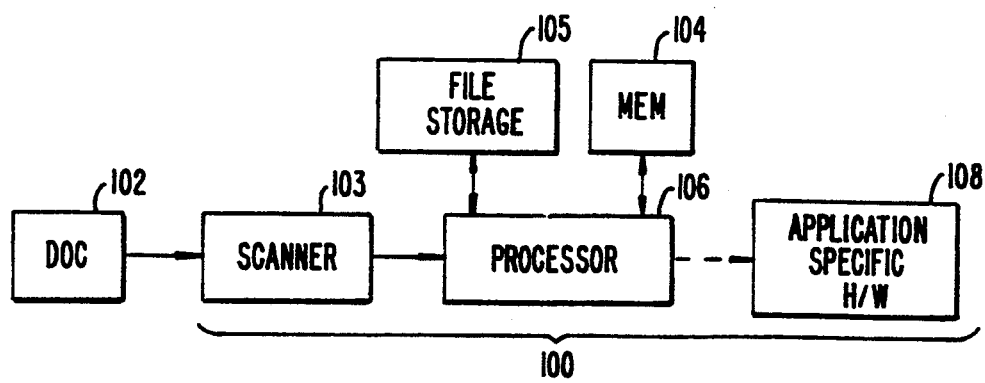
FIG._1A.
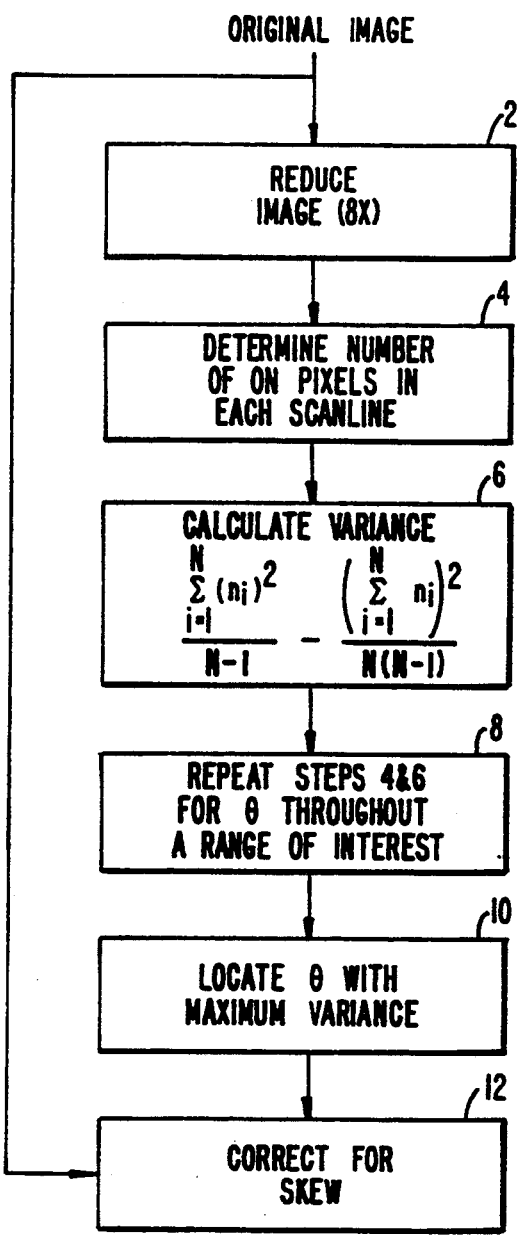
FIG._1B.

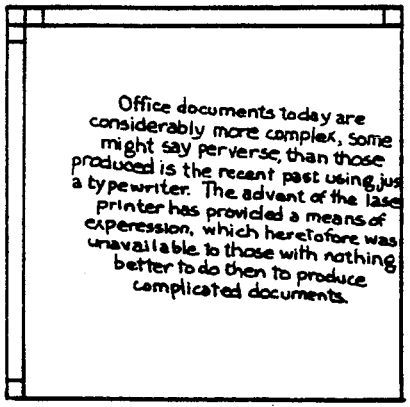
FIG._2A.
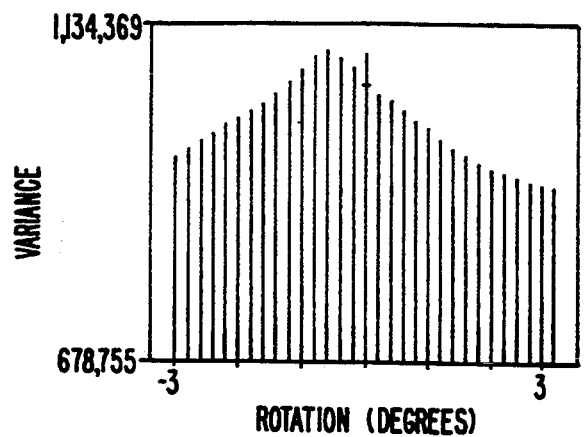
FIG._2B.
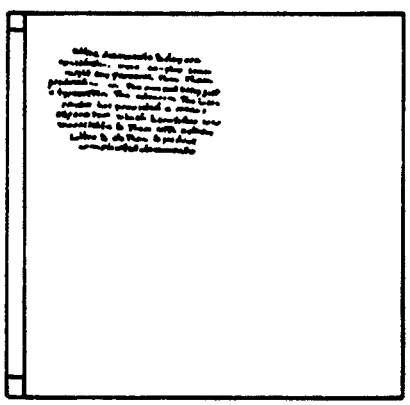
FIG._3A.
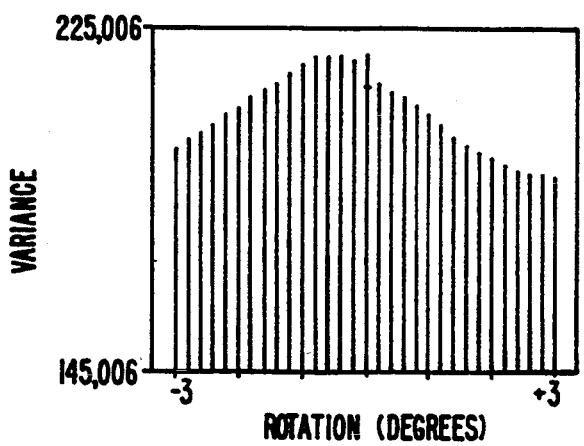
FIG._3B.

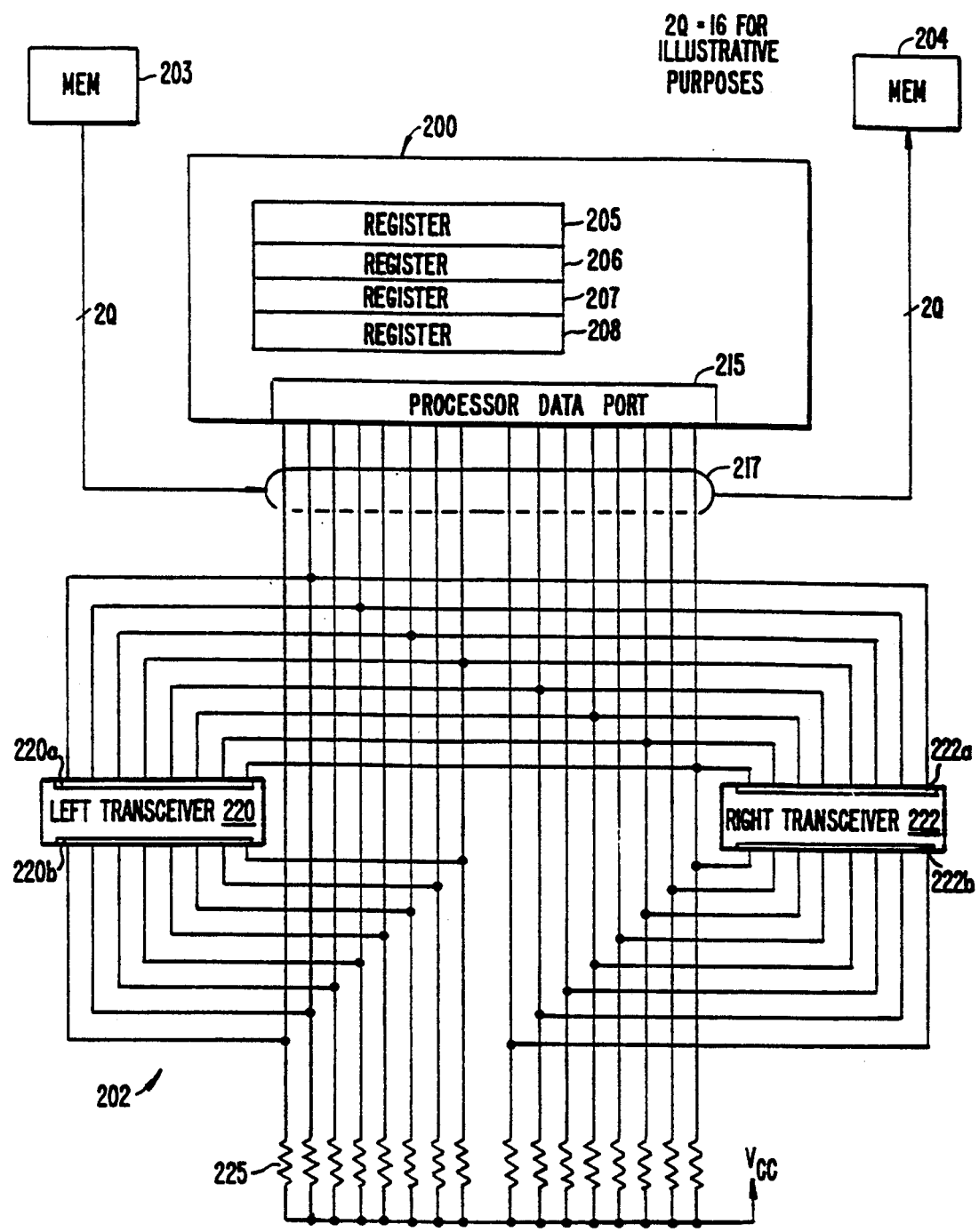
FIG._4.

METHOD AND APPARATUS FOR IDENTIFICATION OF DOCUMENT SKEW

This is a division of application Ser. No. 07/448,774 filed Dec. 8, 1989, now U.S. Pat. No. 5,187,753.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates to the field of image processing. More specifically, in one embodiment the invention provides a method and apparatus for determining the skew of a document containing text and/or graphics and, optionally, adjusting the skew of the document to a desired angle.

In many image processing applications it is desirable to determine skew of a document image. For example, for a text image skew is the angle at which lines of the text image differ from a pre-selected reference line, such as a horizontal line. Optical character recognition systems are exemplary of an image processing system in which it would be desirable to know the angle of skew of text since such systems typically scan horizontally through a portion of a document when processing an image of the document. If a text image is not properly oriented, OCR systems may have difficulty in "recognizing" individual characters and, in severe cases, may actually scan through multiple lines of text.

A variety of methods and devices for determining document skew have been proposed. While meeting with some success, prior methods have met with a variety of limitations. For example, some methods/devices require non-conventional or special purpose hardware, increasing the complexity and cost of such systems. Some systems require unacceptable amounts of computer processing time or computer processing capability. Still other methods operate only on text or require that specialized data representations be utilized.

From the above it is seen that an improved method and apparatus for determining and adjusting document skew is desired.

SUMMARY OF THE INVENTION

The present invention provides an improved method and apparatus for identifying the skew of a document from a bitmap image. Image reduction is optionally used to enhance performance. The image is either rotated or vertically sheared to simulate rotation and a statistical measure, such as the variance of the number of pixels on a scanline, is maximized to determine skew angle.

The method/apparatus will have a variety of applications including use within a document recognition system. The accuracy of most optical character recognition (OCR) systems, for example, degrades badly when text is skewed by more than about 5%. Using the invention herein, an OCR system may quickly check for skew and adjust the skew of the document accordingly.

Alternatively, the present invention could be used within an electro-reprographic (ER) copier. The human eye can detect even a small amount of document skew. Accordingly, such ER copiers may check and compensate for document skew without mechanical complexity using the invention herein. The invention will be particularly useful in cases when an original that is being copied is skewed. Of course, these applications are merely illustrative of the variety of applications of the method and apparatus herein. Other possible applications include, but are not limited to, skew correction for image coding, and the like.

Accordingly, in one embodiment the invention provides an optical character recognition system. The optical character recognition system includes input means for inputting an image of a document; deskewing means comprising: (i) means for rotating the image from at least a first skew angle to a second skew angle; (ii) means for calculating variance of a number of ON pixels in a scanline of the image at each of the skew angles; and (iii) means for rotating the image to about an angle which substantially maximizes the variance to produce a deskewed image. The optical character recognition system further includes means for identifying characters in the deskewed image; and means for outputting the characters in the image.

In another embodiment the invention provides apparatus for copying a document. The apparatus includes input means for inputting an image of a document and deskewing means. The deskewing means includes: (i) means for rotating the image from at least a first skew angle to a second skew angle; (ii) means for calculating variance of a number of ON pixels in a scanline of the image at each of the skew angles; and (iii) means for rotating the image to about an angle which substantially maximizes the variance to produce a deskewed image of the document. The device then further includes means for outputting the deskewed image of the document.

A further understanding of the nature and advantages of the inventions herein may be realized by reference to the remaining portions of the specification and the attached drawings.

BRIEF DESCRIPTION OF THE DRAWINGS

FIG. 1A is an overall block diagram illustrating hardware used herein according to one embodiment of the invention and FIG. 1B is a flowchart illustrating operation of a preferred embodiment of the invention;

FIGS. 2A and 2B are a text image and a plot of variance as a function of skew angle, respectively;

FIGS. 3A and 3B are a text image and plot of variance as a function of skew angle for a reduced image; and FIG. 4 illustrates an improved reduction operation.

DESCRIPTION OF THE PREFERRED EMBODIMENTS

CONTENTS

I. Definitions and Terminology
II. Details of Operation of the Invention
III. Graphical Illustration of the Invention
VI. Discussion of the Software
V. Conclusion

I. Definitions and Terminology

The present discussion deals with binary images. In this context, the term "image" refers to a representation of a two-dimensional data structure composed of pixels. A binary image is an image where a given pixel is either "ON" or "OFF." Binary images are manipulated according to a number of operations wherein one or more source images are mapped onto a destination image. The results of such operations are generally referred to as images. The image that is the starting point for processing will sometimes be referred to as the original image.

Pixels are defined to be ON if they are black and OFF if they are white. It should be noted that the designation of black as ON and white as OFF reflects the fact that most documents of interest have a black foreground and a white background. While the techniques of the present invention could be applied to negative images as well, the discussion will be in terms of black on white. In some cases the discussion makes reference to a "don't care" pixel which may be either an ON or an OFF pixel.

A "solid region" of an image refers to a region extending many pixels in both dimensions within which substantially all the pixels are ON.

A "textured region" of an image refers to a region that contains a relatively fine-grained pattern. Examples of textured regions are halftone or stippled regions.

AND, OR, and XOR are logical operations carried out between two images on a pixel-by-pixel basis.

NOT is a logical operation carried out on a single image on a pixel-by-pixel basis.

"Expansion" is a scale operation characterized by a SCALE factor N, wherein each pixel in a source image becomes an N×N square of pixels, all having the same value as the original pixel.

"Reduction" is a scale operation characterized by a SCALE factor N and a threshold LEVEL M. Reduction with SCALE=N entails dividing the source image into N×N squares of pixels, mapping each such square in the source image to a single pixel on the destination image. The value for the pixel in the destination image is determined by the threshold LEVEL M, which is a number between 1 and $N^2$. If the number of ON pixels in the pixel square is greater or equal to M, the destination pixel is ON, otherwise it is OFF.

"Subsampling" is an operation wherein the source image is subdivided into smaller (typically square) elements, and each element in the source image is mapped to a smaller element in the destination image. The pixel values for each destination image element are defined by a selected subset of the pixels in the source image element. Typically, subsampling entails mapping to single pixels, with the destination pixel value being the same as a selected pixel from the source image element. The selection may be predetermined (e.g., upper left pixel) or random.

A "4-connected region" is a set of ON pixels wherein each pixel in the set is laterally or vertically adjacent to at least one other pixel in the set.

An "8-connected region" is a set of ON pixels wherein each pixel in the set is laterally, vertically, or diagonally adjacent to at least one other pixel in the set.

A number of morphological operations map a source image onto an equally sized destination image according to a rule defined by a pixel pattern called a structuring element (SE). The SE is defined by a center location and a number of pixel locations, each having a defined value (ON or OFF). The pixels defining the SE do not have to be adjacent each other. The center location need not be at the geometrical center of the pattern; indeed it need not even be inside the pattern.

A "solid" SE refers to an SE having a periphery within which all pixels are ON. For example, a solid 2×2 SE is a 2×2 square of ON pixels. A solid SE need not be rectangular.

A "hit-miss" SE refers to an SE that specifies at least one ON pixel and at least one OFF pixel.

"Erosion" is a morphological operation wherein a given pixel in the destination image is turned ON if and only if the result of superimposing the SE center on the corresponding pixel location in the source image results in a match between all ON and OFF pixels in the SE and the underlying pixels in the source image.

"Dilation" is a morphological operation wherein a given pixel in the source image being ON causes the SE to be written into the destination image with the SE center at the corresponding location in the destination image. The SE's used for dilation typically have no OFF pixels.

"Opening" is a morphological operation that consists of an erosion followed by a dilation. The result is to replicate the SE in the destination image for each match in the source image.

"Closing" is a morphological operation consisting of a dilation followed by an erosion.

A "mask" refers to an image, normally derived from an original image, which contains substantially solid regions of ON pixels in a region of interest in the original image.

The various operations defined above are sometimes referred to in noun, adjective, and verb forms. For example, references to dilation (noun form) may be in terms of dilating the image or the image being dilated (verb forms) or the image being subjected to a dilation operation (adjective form). No difference in meaning is intended.

II. Details of Operation of the Invention

The present invention provides a method and apparatus for determining skew directly from a bitmap. In preferred embodiments, all or substantially all pixels in the bitmap are utilized. The variance of the number of ON pixels in a scanline is determined as a function of the angle of rotation of the bitmap. This variance will be substantially maximized when the image has very close to zero skew. Since the method uses all the pixels in the image, it will work on images with only text, only line graphics (if there are some horizontal lines), and on some images with mixed text, stipples and/or halftones.

FIG. 1A is a block diagram of an image analysis system 100 within which the present invention may be embodied. The basic operation of system 100 is to extract or eliminate certain characteristic portions of a document 102. To this end, the system includes a scanner 103 which digitizes the document on a pixel basis, and provides a resultant data structure. Depending on the application, the scanner may provide a binary image (a single bit per pixel) or a gray scale image (a plurality of bits per pixel). This data structure contains the raw content of the document, to the precision of the resolution of the scanner. This data structure, typically referred to as an image, may be sent to a memory 104 or stored as a file in a file storage unit 105, which may be a disk or other mass storage device.

A processor 106 controls the data flow and performs the image processing. Processor 106 may be a general purpose computer, a special purpose computer optimized for image processing operations, or a combination of a general purpose computer and auxiliary special purpose hardware. If a file storage unit is used, the image is transferred to memory 104 prior to processing.

Memory 104 may also be used to store intermediate data structures and possibly a final processed data structure.

The result of the image processing, of which the present invention forms a part, can be a derived image, numerical data (such as coordinates of salient features of the image) or a combination. This information may be communicated to application-specific hardware 108, which may be a printer or display, or may be written back to file storage unit 105.

FIG. 1B is a flowchart illustrating operation of the invention herein. In step 2, the input binary image is optionally reduced so as to accelerate operation of the invention. In preferred embodiments, where the image is scanned at 300 pixels/inch, a reduction of about 4× to 8× is utilized and has provided satisfactory results while significantly increasing the operational speed of the invention. While a conventional "reduction" step is used for purposes of illustration herein, other forms of reduction will also perform satisfactorily such as simple sub-sampling or a thresholded reduction.

In steps 4 to 6 the variance in the number of ON pixels is calculated for a particular angle of rotation of the image. As used herein, the "variance" in the number of ON pixels may mean:

$$\frac{\sum_{i=1}^{N} (n_i)^2}{C_1} - \frac{\left(\sum_{i=1}^{N} n_i\right)^2}{C_2}$$

where:

N is the number of lines utilized;

n is the number of ON pixels in a line;

i is a counter for the lines; and $C_1$ and $C_2$ are constants which may generally be ignored.

Although not critical to operation of the invention, substantially all of the lines of the image are utilized in calculating the variance. When similar documents will be encountered from scan to scan, it will be possible to utilize only a select sampling of scan lines or even a single scan line. In the above formula, all terms except the sum of the square of the number of pixels in a line will be substantially constant and can be ignored. Therefore, in one embodiment, only the sum of the square of the number of ON pixels on each scanline as a function of angle of rotation is calculated. This differs from the variance by a constant independent of skew.

While the invention is illustrated herein by way of the calculation of the square of the number of pixels in a scanline, it will be recognized that other powers could be utilized; any power greater than 1 of the number of ON pixels in a scanline could be effectively utilized. Taking the square is preferred because it is typically faster than any other power. For brevity the above formula in any of its alternative forms is referred to as "variance" herein.

In step 8, the variance is calculated at a wide variety of relatively closely spaced rotation angles. In some embodiments, the image is not actually rotated in order to calculate variance, but instead vertical shear is applied to the image. In a vertical shear operation, vertical blocks of the image are moved upward (or downward) some number of pixels, and the number of pixels shifted increases by one for each block to the right. The horizontal width of each block varies inversely with the shear angle. For example, to simulate a rotation by one degree (approximately 1/57th of a radian), the first vertical block of width 28 pixels is left unchanged, while the next vertical block of width 57 pixels is shifted up by one pixel, the next vertical block of width 57 pixels is shifted up by two pixels, etc.

In preferred embodiments, the image is rotated both positively and negatively about −5 to +5 degrees ($\theta_{max}$) since, in most applications, document skew will not exceed this amount. After calculation of the variance at a number of rotation angles, the angle at which the variance is substantially a maximum is located at step 10 by means well known to those of skill in the art. The maximum in variance need not be located exactly, but it is preferred that the maximum variance be located within at least about ±20% and most preferably within about ±10% such that the variance is substantially a maximum. In some embodiments, the maximum is located by evaluating the variance at a variety of increments between $\pm\theta_{max}$ and interpolated to find the maximum. Other more sophisticated methods may alternatively be used such as interval halving techniques. The angle at which the variance is a maximum will be very close to the angle of skew of the document.

The advantage of performing the operations at reduced scale is that the time to do each operation (such as vertical shearing or counting) varies with the square of the reduction factor. Thus, a reduction by a factor of 4 reduces the computation time by a factor of 16.

Of course, there is a loss in accuracy when a reduced image is used. The relation between the accuracy and the resolution is as follows: the angular resolution (in radians) of the deskew algorithm is approximately 1/(image width in pixels). Thus, if the original image is 2500 pixels wide and is reduced by a factor of 8, the angular resolution will be about 1/300, or about 0.2 degrees which is acceptable in most commercial applications. In practice, the error is typically found to be smaller than this.

Optionally in step 12 the original image is rotated by the negative of the angle determined in step 10 so as to deskew the image. Skew correction is achieved by rotating the image. Efficient means for rotating an image using bitblt (i.e., raster operations) exist are known and are discussed in, for example, Paeth, "A Fast Algorithm for Fast Raster Rotatin," *Proc. Vision Interface '86*, Vancouver B.C., May 1986, pg. 77-81, which is incorporated by reference herein for all purposes. For small angles of rotation (say, less than 5 degrees), rotation can be approximated by two orthogonal shears. For larger angles, rotation can be approximated by three shears, with the first and third shear of equal magnitude in the horizontal direction and the second larger shear in the vertical direction.

One requirement of efficient operation, is that thresholded reduction must be done quickly. Suppose it is desired to reduce an image by a factor of two in the vertical direction. One way to do this is to use a raster operation (bitblt—bit block transfer) to logically combine the odd and even rows, creating a single row of the reduced image for each pair of rows in the original. The same procedure can then be applied to the columns of the vertically squashed image, giving an image reduced by a factor of two in both directions.

The result, however, depends on the logical operations of the horizontal and vertical raster operations. Obtaining a result with LEVEL=1 or 4 is straightforward. If an OR is used for both raster operation orientations, the result is an ON pixel if any of the four pixels within the corresponding 2×2 square of the original were ON. This is simply a reduction with LEVEL=1. Likewise, if an AND for both raster operation orientations, the result is a reduction with LEVEL=4, where all four pixels must be ON.

A somewhat different approach is used to obtain a reduction with LEVEL=2 or 3. Let the result of doing a horizontal OR followed by a vertical AND be a reduced image R1, and let the result from doing a horizontal AND followed by a vertical OR be a reduced image R2. A reduction with LEVEL=2 is obtained by ORing R1 with R2, and a reduction with LEVEL=3 is obtained by ANDing R1 with R2.

The procedure may not be computationally efficient if implemented as described above. On some computers, such as Sun workstations, raster operations are done in software. The image is stored as a block of sequential data, starting with the first row of the image, moving left-to-right, then the second row, etc. Consequently, the raster operations between rows are fast, because 16 or 32 bits in two words can be combined in one operation. But to perform a raster operation between two columns, the corresponding bits must be found, two bits at a time (one from each column), before the logical operations can be done. It turns out that the time, per pixel, to do the vertical raster operations is at least 25 times greater than the horizontal ones. In fact, when the method is implemented entirely with raster operations, over 90 percent of the time is devoted to the vertical operations.

Fortunately, there is a simple and very fast way to implement the logical operations between columns. Rather than use column raster operations, take 16 sequential bits, corresponding to 16 columns in one row. These 16 bits can be accessed as a short integer. These 16 bits are used as an index into a $2^{16}$-entry array (i.e., a lookup table) of 8-bit objects. The 8-bit contents of the array give the result of ORing the first bit of the index with the second, the third bit with the fourth . . . and on to the 15th bit with the 16th. Actually, two arrays are needed, one for ORing the 8 sets of adjacent columns, and one for ANDing the columns. It should be understood that the numerical example is just that, an example. It is also possible to implement this as a $2^8$-entry array of 4-bit objects, or any one of a number of other ways.

The use of lookup tables to implement column logical operations is about as fast, per pixel, as Sun's row raster operations. A 1000×1000 pixel image can be reduced on a Sun 3/260, with either LEVEL=1 or 4, to a 500×500 pixel image in 0.10 second. On a Sun 4/260, the operation takes about 0.06 second.

As discussed above, 2×2 reductions require a first logical operation between rows followed by a second, possibly different, logical operation between columns. Moreover, some threshold levels require two intermediate reduced images which are then combined. The table lookup technique for column operations can become cumbersome if it is desired to have a very wide pixelword. Either the table becomes enormous or one needs special techniques of looking up parts of the wide pixelword in multiple parallel tables. The latter, while clearly superior, does require some way to use portions of the data word as memory addresses, which may not otherwise be necessary.

FIG. 4 is a logic schematic of specialized hardware for performing a logical operation between vertically adjacent 2Q-bit pixelwords and a pairwise bit reduction of the resulting 2Q-bit pixelword (bits 0 through 2Q-1). Although the drawing shows a 16-pixel word, the benefits of this hardware would become manifest for much longer pixelwords where the lookup table technique has become cumbersome. A 512-bit pixelword is contemplated, since a line of image would represent only a few pixelwords.

The reduction of the two pixelwords occurs in two stages, designated 200 and 202. In the first stage, a vertically adjacent pair of pixelwords is read from a first memory 203, and the desired first logical operation is carried out between them. The desired second logical operation is then carried out between the resulting pixelword and a version of the pixelword that is shifted by one bit. This provides a processed pixelword having the bits of interest (valid bits) in every other bit position. In the second stage, the valid bits in the processed pixelword are extracted and compressed, and the result stored in a second memory 204. Memory 203 is preferably organized with a word size corresponding to the pixelword size. Memory 204 may be organized the same way.

The preferred implementation for stage 200 is an array of bit-slice processors, such as the IDT 49C402 processor, available from Integrated Device Technology. This specific processor is a 16-bit wide device, each containing 64 shiftable registers. Thirty-two such devices would be suitable for a 512-bit pixelword. For simplification, only four registers 205, 206, 207, and 208 of one 16-bit device 210 are shown. Among the processor's operations are those that logically combine the contents of first and second registers, and store the result in the first. The processor has a data port 215, which is coupled to a data bus 217.

Second stage 202 includes first and second latched transceivers 220 and 222, each half as wide as the pixelword. Each transceiver has two ports, designated 220a and 220b for transceiver 220 and 222a and 222b for transceiver 222. Each transceiver is half as wide as the pixelword. Ports 220a and 222a are each coupled to the odd bits of data bus 217, which correspond to the bits of interest. Port 220b is coupled to bits 0 through (Q-1) of the data bus, while port 222b is coupled to bits Q through (2Q-1). The bus lines are pulled up by resistors 125 so that undriven lines are pulled high.

Consider the case of a 2×2 reduction with LEVEL=2. The sequence of operations requires that (a) a vertically adjacent pair of pixelwords be ANDed to form a single 2Q-bit pixelword, adjacent pairs of bits be ORed to form a Q-bit pixelword, and the result be stored; (b) the vertically adjacent pair of pixelwords be ORed, adjacent bits of the resultant 2Q-bit pixelword be ANDed, and the resultant Q-bit pixelword be stored; and (c) the two Q-bit pixelwords be ORed.

To effect this, a pair of vertically adjacent pixelwords are read from first memory 203 onto data bus 217 and into registers 205 and 206. Registers 205 and 206 are ANDed and the result stored in registers 207 and 208. The content of register 208 is shifted one bit to the right, registers 207 and 208 are ORed, and the result is stored in register 208. Registers 205 and 206 are ORed, and the result stored in registers 206 and 207. The content of register 207 is right shifted by one bit, registers 206 and 207 are ANDed, and the result stored in register 207.

At this point, register 207 contains the result of ORing the two pixelwords and ANDing pairs of adjacent bits, while register 208 contains the result of ANDing the pixelwords and ORing pairs of adjacent bits.

However, registers 207 and 208 contain the valid bits in the odd bit positions 1, 3, . . . (2Q-1). For a reduction with LEVEL=2, registers 207 and 208 are ORed and the result is made available at processor data port 215 which is coupled to data bus 217.

The odd bits of the data bus are latched into transceiver 220 through port 220a, resulting in a Q-bit pixelword with the valid bits in adjacent positions. Although this Q-bit entity could be read back onto the bus and transferred to memory 204, it is preferable to use both latches. Thus, two new pixelwords (horizontally adjacent to the first two) are processed at stage 200 as described above, the result is made available at processor data port 215, and is latched into transceiver 222 through port 222a. The contents of the two transceivers are then read out through ports 220b and 222b onto data bus 217 in order to provide a 2Q-bit pixelword that represents the reduction of four 2Q-bit pixelwords. The result is transferred to second memory 204. This overall sequence continues until all the pixelwords in the pair of rows has been processed. Once the pair of rows has been processed, subsequent pairs are similarly processed.

As mentioned above each bit-slice processor has 64 registers. Accordingly, since memory accesses are more efficient in a block mode, faster operation is likely to result if 8 pairs of pixelwords are read from memory 203 in a block, processed as discussed above, stored in the processor's registers, and written to memory 204 in a block.

Image enlargement is similar, but the steps are executed in the reverse order. First, the processor reads a pixelword and sends the left half through port 220b of transceiver 220. This is read onto the bus through port 220a. Only every other pixel in the resulting word on the bus will initially be valid, so the processor will need to validate all the pixels using a sequence of shifts and logic operations. Since resistors 225 pull up all the bus lines that are not driven, each undriven line, all the even bits in this case, will be 1's. This expanded pixelword, which alternates 1's with valid data, is read into two registers, the content of one register is shifted one place, and the registers are logically ANDed. Everywhere there was a 0 in an odd bit, there will be 00 in an even-/odd pair. None of the other bits will be affected. This pixelword is then written to two vertically adjacent words in the expanded image. This process is repeated for the right half of the pixelword using the transceiver 222. The processor expands the entire row one pixelword at a time and the entire image one row at a time.

III. Graphical Illustration of the Invention

FIGS. 2 and 3 illustrate operation of the invention in graphical form. A 2× reduction is used to compute the skew angle for the text image shown in FIG. 2A. The variance for the image shown in FIG. 2A is shown in FIG. 2B. The calculated skew is found to be −0.60 degrees. In FIG. 3 a 4× reduction (shown in FIG. 3B) is used to compute the skew angle for the image. The variance curve for the image shown in FIG. 3A is shown in FIG. 3B. The calculated variance is a maximum at −0.66 degrees. The actual skew angle is about −0.60 degrees, showing typical accuracy of the method.

IV. Discussion of the Software

The method described above has been implemented in "C" using the software provided in Appendix 1 (© Copyright, Unpublished Work, Xerox Corporation, all rights reserved) on a Sun 3/260. While the invention is illustrated herein by way of a C program for use on the Sun 3/260, it will be apparent to those of skill in the art that a variety of programming languages and hardware configurations could be effectively utilized. Using 8-fold reduction on an $8\frac{1}{2} \times 11$ page, the attached program takes about 4 seconds to determine skew angle. Improved performance could readily be achieved through optimization of the software.

V. Conclusion

The present invention provides a fast and accurate method of determining document skew. It is to be understood that the above description is intended to be illustrative and not restrictive. Many variations of the invention will become apparent to those of skill in the art upon review of this disclosure. For example, while the invention is illustrated above primarily with reference to maximizing the variance in the number of ON pixels in a scanline, the invention could readily be applied by optimizing the variance in the number of OFF pixels in a scanline as a function of rotation. The scope of the invention should, therefore, be determined not with reference to the above description, but instead should be determined with reference to the appended claims along with their full scope of equivalents.

What is claimed is:

1. A method of determining skew of an image in an optical character recognition device (OCR) comprising the steps of optically scanning a document to produce an image of said document in the form of a digital data structure, said image including a plurality of scanlines comprising ON and OFF pixels; determining a variance in a number of ON pixels in at least one scanline of said image as a function of document rotation angle, said variance calculated by an equation of the form:

$$\sum_{i=1}^{N} (n_i)^p$$

where:
  N is a number of scan lines;
  p is a real number greater than 1;
  n is the number of all ON pixels in a scan line; and
  i is a counter for the scan lines,
said skew located at a document rotation angle at which said variance is substantially a maximum;
  rotating said image about an angle of about said skew to produce a deskewed image of said document; and
  identifying characters in a deskewed image of said document.

2. A method of determining skew of an image in an optical character recognition device (OCR) comprising the steps of optically scanning a document to produce an image of said document in the form of a digital data structure, said image including a plurality of scanlines comprising ON and OFF pixels; determining a variance in a number of OFF pixels in at least one scanline of said image as a function of document rotation angle, said variance calculated by an equation of the form:

$$\sum_{i=1}^{N} (n_i)^p$$

where:

N is a number of lines;
p is a real number greater than 1;
n is the number of all OFF pixels in a line; and
i is a counter for the lines,
said skew located at a document rotation angle at which said variance is substantially a maximum;
rotating said image about an angle of about said skew to produce a deskewed image of said document; and
identifying characters in a deskewed image of said document.

3. The method as recited in claims 1 or 2 wherein p is 2.

4. The method as recited in claims 1 or 2 wherein substantially all of the scanlines in a document are included the calculation of said variance.

5. The method as recited in claims 1 or 2 wherein document rotation angles are simulated by a vertical shear of said image.

6. The method as recited in claims 1 or 2 wherein variance is calculated through a range of about +5 to −5 degrees of rotation.

7. The method as recited in claims 1 or 2 wherein variance is calculated at increments of about 0.2 degrees of rotation.

8. The method as recited in claims 1 or 2 further comprising the step of rotating said image by an angle of about said skew so as to produce a deskewed document image.

9. The method as recited in claim 8 wherein said step of rotating using at least about two orthogonal shears.

10. The method as recited in claim 8 further comprising the step of reproducing said deskewed document image.

11. An optical character recognition device (OCR) programmed to determine skew of an image of a document, said OCR comprising:
an optical scanner producing an image of said document in the form of a digital data structure, said image including a plurality of scanlines comprising ON and OFF pixels;
a digital processor programmed to input said image of said document and determine a variance in a number of ON pixels in at least one scanline of said image as a function of document rotation angle, said processor programmed to calculate said variance by an equation of the form:

$$\sum_{i=1}^{N} (n_i)^p$$

where:
N is a number of scan lines;
p is a real number greater than 1;
n is the number of all ON pixels in a scan line; and
i is a counter for the scan lines,
said skew located at a document rotation angle at which said variance is substantially a maximum; and
means for rotating said image about an angle of about said skew to produce a deskewed image of said document; and
means for identifying characters in a deskewed image said document.

12. An optical character recognition device (OCR) programmed to determine skew of an image of a document, said OCR comprising:
an optical scanner producing an image of said document in the form of a digital data structure, said image including plurality of scanlines comprising ON and OFF pixels;
a digital processor programmed to input said image of said document and determine a variance in a number of OFF pixels in at least one scanline of said image as a function of document rotation angle, said processor programmed to calculate said variance by an equation of the form:

$$\sum_{i=1}^{N} (n_i)^p$$

where:
N is a number of scan lines;
p is a real number greater than 1;
n is the number of all OFF pixels in a scan line; and
i is a counter for the scan lines,
said skew located at a document rotation angle at which said variance is substantially a maximum;
means for rotating said image about an angle of about said skew to produce a deskewed image of said document; and
means for identifying characters in a deskewed image of said document.

13. The digital processing device as recited in claims 11 or 12 wherein p is programmed to be 2.

14. The digital processing device as recited in claims 11 or 12 programmed to input substantially all of the scanlines in a document are to calculate said variance.

15. The digital processing device as recited in claims 11 or 12 programmed to simulate said rotation angle by a vertical shear of said image.

16. The digital processing device as recited in claims 11 or 12 programmed to calculate said variance is over a range of about ±5 degrees of rotation.

17. The digital processing device as recited in claims 11 or 12 programmed to calculate said variance is at increments of about 0.2 degrees of rotation.

18. The digital processing device as recited in claims 11 or 12 programmed to rotate said image by an angle of about said skew so as to produce a deskewed document image.

19. The digital processing device as recited in claim 18 programmed to rotate said image using at least about two orthogonal shears.

20. The digital processing device as recited in claim 18 further comprising reproduction means for reproducing said deskewed document image.

21. An optical character recognition system comprising:
a) an optical scanner for producing an image of a document in the form of a digital data structure, said image including a plurality of scanlines comprising ON and OFF pixels;
b) input means for inputting said image of a document;
c) a digital processor for deskewing said image, said digital processor comprising:
i) means for simulating rotation of said image from at least a first skew angle to a second skew angle;
ii) means for calculating variance of a number of ON pixels in a scanline of said image at each of said skew angles, said calculating means programmed to calculate said variance by an equation of the form:

$$\sum_{i=1}^{N} (n_i)^p$$

where:
N is a number of lines;
p is a real number greater than 1;
n is the number of all ON pixels in a line; and
i is a counter for the lines; and
iii) means for rotating said image to about an angle which substantially maximizes said variance to produce a deskewed image;
d) means for identifying characters in said deskewed image; and
e) means for outputting said characters in said image.

22. Apparatus for copying a document comprising:
a) an optical scanner for producing an image of a document in the form of a digital data structure, said image including a plurality of scanlines comprising ON and OFF pixels;
b) input means for inputting said image of a document;
c) a digital processor for deskewing said image, said digital processor comprising:
  i) means for simulating rotation of said image from at least a first skew angle to a second skew angle;
  ii) means for calculating variance of a number of ON pixels in a scanline of said image at each of said skew angles, said calculating means programmed to calculate said variance by an equation of the form:

$$\sum_{i=1}^{N} (n_i)^p$$

where:
N is a number of scanlines;
p is a real number greater than 1;
n is the number of all ON pixels in a scan line; and
i is a counter for the scan lines; and
  iii) means for rotating said image to about an angle which substantially maximizes said variance to produce a deskewed image;
d) means for outputting said deskewed image of said document.

23. An electroreprographic (ER) copier programmed to determine skew of an image of a document, said ER copier comprising:
an optical scanner producing an image of said document in the form of a digital data structure, said image including a plurality of scanlines comprising ON and OFF pixels;
a digital processor programmed to input said image of said document and determine a variance in a number of ON pixels in at least one scanline of said image as a function of document rotation angle, said processor programmed to calculate said variance by an equation of the form:

$$\sum_{i=1}^{N} (n_i)^p$$

where:
N is a number of scan lines;
p is a real number greater than 1;
n is the number of all ON pixels in a scan line; and
i is a counter for the scan lines,
said skew located at a document rotation angle at which said variance is substantially a maximum;
means for rotating said image about an angle of about said skew to produce a deskewed image of said document; and
means for outputting said deskewed image of said document.

24. An electroreprographic (ER) copier programmed to determine skew of an image of a document, said ER copier comprising:
an optical scanner producing an image of said document in the form of a digital data structure, said image including a plurality of scanlines comprising ON and OFF pixels;
a digital processor programmed to input said image of said document and determine a variance in a number of OFF pixels in at least one scanline of said image as a function of document rotation angle, said processor programmed to calculate said variance by an equation of the form:

$$\sum_{i=1}^{N} (n_i)^p$$

where:
N is a number of scan lines;
p is a real number greater than 1;
n is the number of all OFF pixels in a scan line; and
i is a counter for the scan lines,
said skew located at a document rotation angle at which said variance is substantially a maximum;
means for rotating said image about an angle of about said skew to produce a deskewed image of said document; and
means for outputting a deskewed image of said document.

25. The method of claim 23 wherein the step of producing a visual reproduction comprises printing said deskewed image of said document.

26. The method of claim 24 wherein the step of producing a visual reproduction comprises printing said deskewed image of said document.

* * * * *